US006196575B1

(12) United States Patent
Ellerbrok et al.

(10) Patent No.: US 6,196,575 B1
(45) Date of Patent: Mar. 6, 2001

(54) GAS BAG RESTRAINT SYSTEM FOR VEHICLE OCCUPANTS

(75) Inventors: Norbert Ellerbrok, Alfdorf; Norbert Lang, Leinzell, both of (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/121,510

(22) Filed: Jul. 23, 1998

(30) Foreign Application Priority Data

Jul. 23, 1997 (DE) .......................................... 297 13 111 U

(51) Int. Cl.[7] .................................................. B60R 21/24
(52) U.S. Cl. ............................................ 280/729; 280/743.1
(58) Field of Search ................................. 280/743.1, 735, 280/729, 741, 736, 741.2

(56) References Cited

U.S. PATENT DOCUMENTS

| | | | |
|---|---|---|---|
| 3,476,402 | * 11/1969 | Wilfert ................................. | 280/729 |
| 3,752,501 | * 8/1973 | Daniel et al. ......................... | 280/729 |
| 4,006,918 | * 2/1977 | MacFarland ......................... | 280/729 |
| 5,240,283 | * 8/1993 | Kishi et al. .......................... | 280/729 |
| 5,253,892 | * 10/1993 | Satoh ............................. | 280/743.1 X |
| 5,358,273 | * 10/1994 | Onishi et al. ....................... | 280/743.1 |
| 5,454,595 | * 10/1995 | Olson et al. ....................... | 280/743.1 |
| 5,520,413 | * 5/1996 | Mossi et al. .......................... | 280/729 |
| 5,560,649 | * 10/1996 | Saderholm et al. ............... | 280/743.1 |
| 5,577,765 | * 11/1996 | Takeda et al. ........................ | 280/729 |
| 5,697,641 | * 12/1997 | McGee et al ....................... | 280/743.1 |
| 5,791,685 | * 8/1998 | Lachat et al. ....................... | 280/473.1 |
| 5,799,973 | * 9/1998 | Bauer et al. .......................... | 280/741 |
| 5,803,495 | * 9/1998 | Jackson et al. ................... | 280/743.1 |
| 5,871,232 | * 2/1999 | White .................................. | 280/735 |
| 5,906,391 | * 5/1999 | Weir et al. ............................ | 280/729 |
| 5,906,393 | * 5/1999 | Mazur et al. ........................ | 280/735 |
| 5,943,295 | * 8/1999 | Varga et al. ........................... | 367/99 |
| 5,951,038 | * 9/1999 | Taguchi et al. ...................... | 280/729 |
| 5,951,044 | * 9/1999 | Berger ............................... | 280/743.1 |
| 5,954,360 | * 9/1999 | Griggs, III et al. ............... | 280/735.1 |
| 5,975,564 | * 11/1999 | Smith et al. ......................... | 280/729 |
| 6,032,977 | * 3/2000 | Reh et al. ............................ | 280/729 |

* cited by examiner

Primary Examiner—Brian L. Johnson
Assistant Examiner—Bryan Fischmann
(74) Attorney, Agent, or Firm—Tarolli, Sundheim, Covell, Tummino & Szabo L.L.P.

(57) ABSTRACT

A gas bag restraint system for vehicle occupants, comprises a gas bag with an interior having a first and a second chamber. The gas bag has an outer wall delimiting the interior of the gas bag and at least one dividing wall in the interior for separating the first and the second chambers in a fully inflated state of the gas bag. The dividing wall is gas-permeable at least during fully inflating of the gas bag to reach a fully inflated state of the gas bag. The system further comprises a multiple-stage gas generator which is communicated with the first chamber and which is able to produce different internal pressures of the gas bag.

20 Claims, 4 Drawing Sheets

GAS BAG RESTRAINT SYSTEM FOR VEHICLE OCCUPANTS

TECHNICAL FIELD

The invention relates to a gas bag restraint system for vehicle occupants.

BACKGROUND OF THE INVENTION

From German Patent DE 29 44 319 A1 a gas bag restraint system is known with a gas bag which can take up various volumes depending on the intensity of the impact. In the non-unfolded state, two chambers are provided, with a tear seam connecting opposite sections of the outer wall with each other. Thereby, only one chamber can be inflated when the interior pressure of the gas bag is not sufficient to destroy the tear seam. In the case of a collision with high impact intensity, the internal pressure in the gas bag is increased so that the tear seam is destroyed and the gas bag can take up a greater volume. In this case, not two chambers are formed, but rather one large chamber is produced. A problem of the gas bags known hitherto consists in that the abruptly unfolding gas bag strikes against an occupant sitting close to the restraint system and not yet moving forward relative to the vehicle. In addition, in fully inflated state when the occupant falls into it, the gas bag is relatively hard.

A further gas bag restraint system is shown in the DE 92 11 421 U1. This gas bag restraint system comprises a gas bag with two chambers, one chamber, namely the greater of the two, offering protection at the primary impact of the vehicle occupant and thereafter collapsing relatively quickly. The second chamber, on the other hand, collapses distinctly later than the first chamber, so that in the case of a secondary impact the vehicle occupant does not hit against hard parts such as the gas generator. In this known restraint system, always both chambers are unfold. Valve flaps on the dividing wall between the first and the second chamber permit a passage of gas exclusively from the first into the second chamber.

BRIEF SUMMARY OF THE INVENTION

The invention provides a gas bag restraint system, in which the unfolding gas bag, when the occupant is sitting relatively close to the gas bag restraint system, strikes onto the occupant with lower force. In addition, when the occupant falls into the gas bag, the gas bag is not as hard as the previous gas bags so that the risk of injury as a whole can be reduced. The gas bag restraint system according to the invention comprises a gas bag with an interior having a first and a second chamber. The gas bag has an outer wall delimiting the interior of the gas bag and at least one dividing wall in the interior for separating the first and the second chambers in the fully inflated state of the gas bag. The dividing wall is gas-permeable at least while the gas bag is inflating to reach a fully inflated state of the gas bag. The system further comprises a multiple-stage gas generator which is communicated with the first chamber and which is able to produce different internal pressures of the gas bag. Thereby, it can be achieved that one chamber or both chambers are inflated. On inflating of both chambers, the second chamber, however, is inflated with a delay, which distinctly reduces the risk of injury, without restricting the restraining effect. The dividing wall can be gas-permeable only upon reaching a predetermined internal gas bag pressure, e.g. by providing openings with a valve function, or can be permanently open, e.g. by a dividing wall of a gas-permeable material.

The invention is based on the knowledge that the above-mentioned disadvantages can be effectively prevented by a delayed inflating of the gas bag. Whereas in the prior art German Patent DE 29 44 319 A1 the tear seam is destroyed abruptly and the single large chamber which is then formed is inflated suddenly, in the gas bag restraint system according to the invention a dividing wall is always provided, which divides the interior of the gas bag into several chambers. If not only the first but also the second chamber is to be inflated, the dividing wall provides for that the gas flow from the first into the second chamber is throttled and the second chamber is inflated with a delay in relation to the first chamber. Single-chambered gas bags which were usual hitherto are already completely filled after approximately 39 ms. On the other hand, the gas bag according to the invention is only filled after approximately 42 ms or later, whereby a slower pressure rise is produced in its interior.

The dividing wall can have at least one through-flow opening and/or be of a gas-permeable material.

Preferably, holding means are provided which prevent an unfolding of the part of the outer wall delimiting the second chamber before reaching the predetermined internal pressure of the gas bag, and which permit the full inflation of the second chamber after the predetermined internal pressure of the gas bag has been reached.

In the preferred embodiment, the multiple-stage generator produces gas in at least two stages which are identical in terms of output and which are able to be activated separately from each other, whereby, as tests have shown, a good evolution of the pressure over the time is produced in the interior of the gas bag. Moreover, stages which are differing with respect to output can also be provided. So that the energy arising on ignition of the propellant charges is not released too abruptly and so that the pressure rise does not occur too suddenly, a control unit, which is coupled with sensors and with the gas generator, can ignite provided ignition units in a manner staggered in time with respect to each other. Thus, a gradual evolution of pressure is produced.

DETAILED DESCRIPTION OF THE DRAWINGS

DETAILED DESCRIPTION OF PREFERRED EMBODIMENTS

Figure 1:
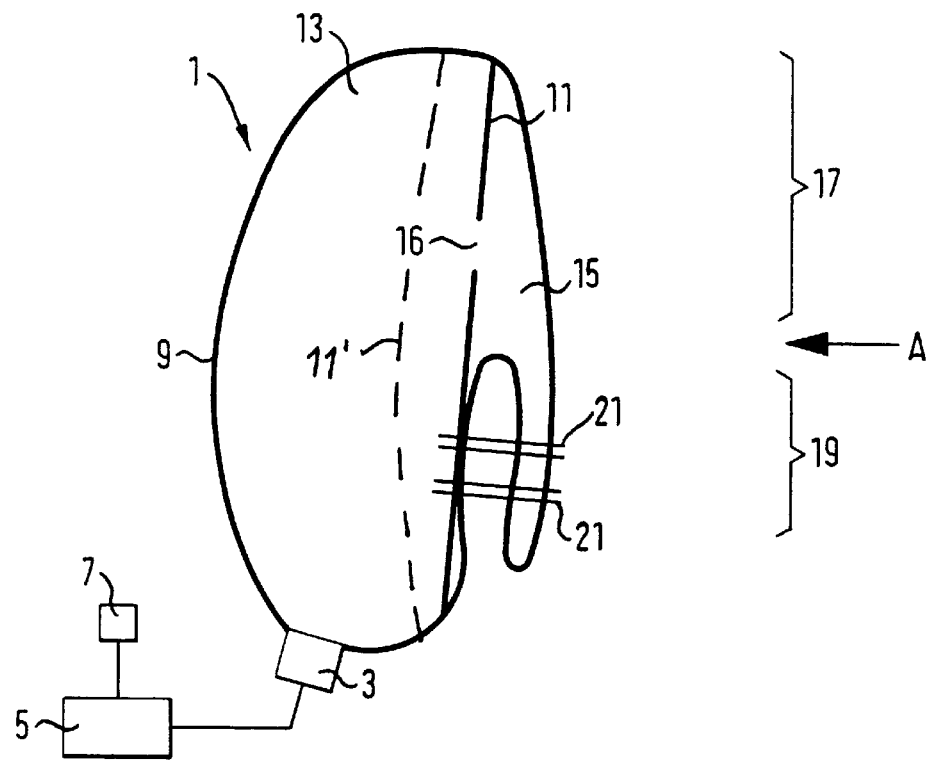
FIG. 1 shows a diagrammatic cross-sectional view through the gas bag and the gas generator of the gas bag restraint system according to the invention, when only the first chamber is inflated.
Figure 2:
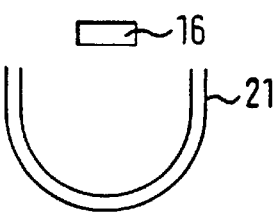
FIGS. 2 to 5 show views in the direction of the arrow A illustrated in FIG. 1, of various embodiments of the gas bag, with only one through-flow opening and various tear seam forms being illustrated.
Figure 3:
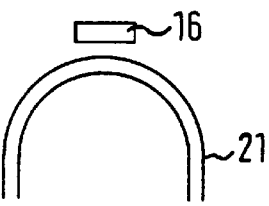
Figure 4:
Figure 5:
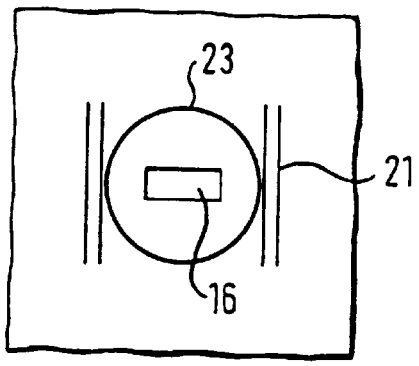

In FIG. 1 a gas bag restraint system is shown, which comprises a gas bag 1, a multiple-stage gas generator 3 and also a control unit 5, connected with the ignition units (not shown) in the gas generator 3. The control unit 5 is connected with several sensors, of which only the sensor 7 is illustrated symbolically. The gas bag I consists of an outer wall 9 and of a dividing wall 11 provided inside the gas bag 1, which dividing wall 11 divides the interior of the gas bag 1 into a first chamber 13 and a second chamber 15, which are communicated with each other via a through-flow opening 16. The gas generator 3 is directly connected only with the first chamber 13.

In the state illustrated in FIG. 1, only the first chamber 13 is inflated, whereas the part of the outer wall 9 belonging to the second chamber 15 remains folded. In this state, the outer wall 9 of the second chamber 15 has two sections, namely an upper section 17 without folds, which in the folded state covers the through-flow opening 16, and a lower, folded section 19. For the purpose of clarification, in FIG. 1 the wall 9 of the second chamber 15 is illustrated distinctly spaced apart from the dividing wall 11, however, actually the outer wall 9 of the second chamber 15 lies almost against the dividing wall 11. In the folded region 19, superimposed sections of the outer wall 9 are connected to each other by holding means in the form of tear seams 21; these holding means connect the part of the outer wall 9, belonging to the second chamber 15, in addition with the dividing wall 11. Accordingly in case only the first chamber 13 is to be inflated, the part of the outer wall delimiting the second chamber 15 can not unfold.

Instead of only one dividing wall, several dividing walls separating more than two chambers can be provided as outlined by the additional dividing wall 11' shown in dashed lines.

In FIGS. 2 to 5, various courses of tear seams 21 are illustrated. The tear seams 21 consist of a double seam having a U-shape in FIG. 2 and an n-shape in FIG. 3, with the through-flow opening 16 lying outside of the section of the outer wall 9 circumscribed by the U- or n-shape. In the embodiment illustrated in FIG. 4, two pairs of tear seams 21 are spaced apart from each other which, viewed transversely to their longitudinal direction, terminate before reaching the through-flow opening 16. In the embodiment shown in FIG. 5, two pairs of parallel tear seams 21 and additionally a tear seam 23 surrounding the through-flow opening 16 are provided.

Figure 7:
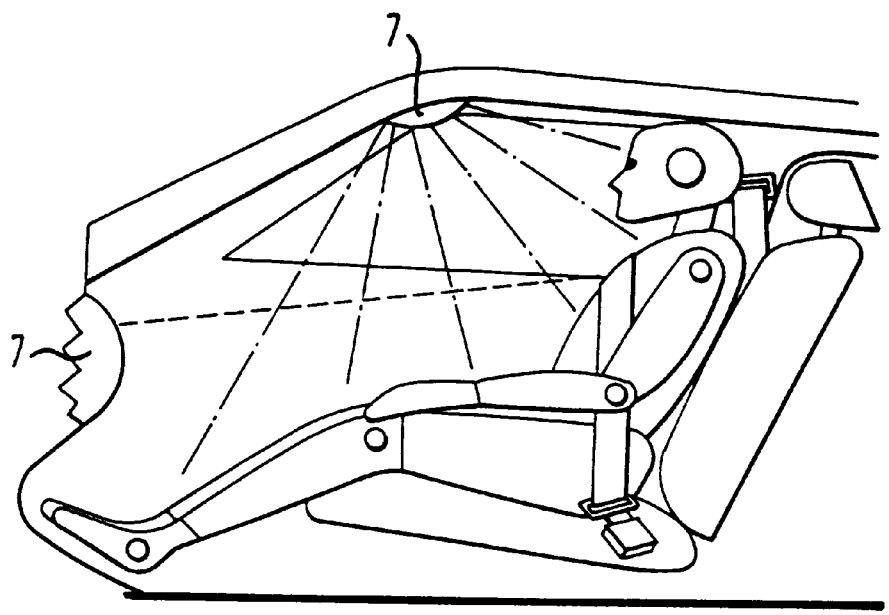
FIG. 7 shows a diagrammatic side view of the occupant, sitting in the vehicle, who is to be protected by the gas bag restraint system according to the invention, which view shows the mode of operation of various sensors as part of the gas bag restraint system.

The multiple-stage gas generator 3 has two output stages. A greater or lesser quantity of gas, becoming released, thus flows into the interior of the gas bag 1 depending on whether one or both stages are activated. Whether one or both stages are ignited depends on various factors. If, for example, the occupant who is to be protected by the gas bag 1 is relatively small and if his upper body is relatively close to the folded gas bag 1, it may be sufficient if only the first chamber 13 is inflated, because seating positions are conceivable in which an inflating of the second chamber 15 would lead to a hard striking of the gas bag onto the occupant who is not yet moving forward. In addition, the position of the vehicle occupant transversely to the longitudinal direction, when he is not approximately central to the vehicle seat, can lead to it being more advantageous to only inflate one chamber, in order to restrain the occupant. On inflation of both chambers 13, 15, it could occur that the gas bag unfolds laterally past the vehicle occupant and hence no longer has any restraining function. Likewise, the state of application of the belt and the impact intensity in the case of a collision can lead to it being more advantageous to only inflate one and not both chambers 13, 15. If the respective seat is not occupied at all, of course there is no need even to only inflate the first chamber 13 in the case of a collision. The above-mentioned factors which co-determine the decision as to whether one or both chambers are inflated, are determined by sensors 7 and are processed in the control unit 5 which transfers corresponding signals to the gas generator 3 and initiates the activation of ignition units. The position of the vehicle occupant in the vehicle is determined by means of three ultrasonic sensors arranged above the windscreen inside the vehicle, as illustrated in FIG. 7, the radiation cones of which sensors are shown in FIG. 7, which scan a) the head and the upper body,
b) the chest and the pelvis, and
c) the thigh region of the occupant. In addition, an ultrasonic sensor 7 can also be arranged in the region of the dashboard.

In addition, the decision as to whether one or both chambers 13, 15 must be inflated, can be dependent on whether the occupant who is to be restrained is light or heavy. In the case of a heavy occupant, the gas bag must be harder and usually of a larger volume than in the case of a light occupant, who usually sits relatively close to the gas bag 1 which is not yet unfolded. Only when both chambers 13, 15 are inflated the internal pressure of the gas bag can rise above the predetermined gas bag internal pressure in the first chamber 13, at which the tear seam is destroyed.

Figure 6:
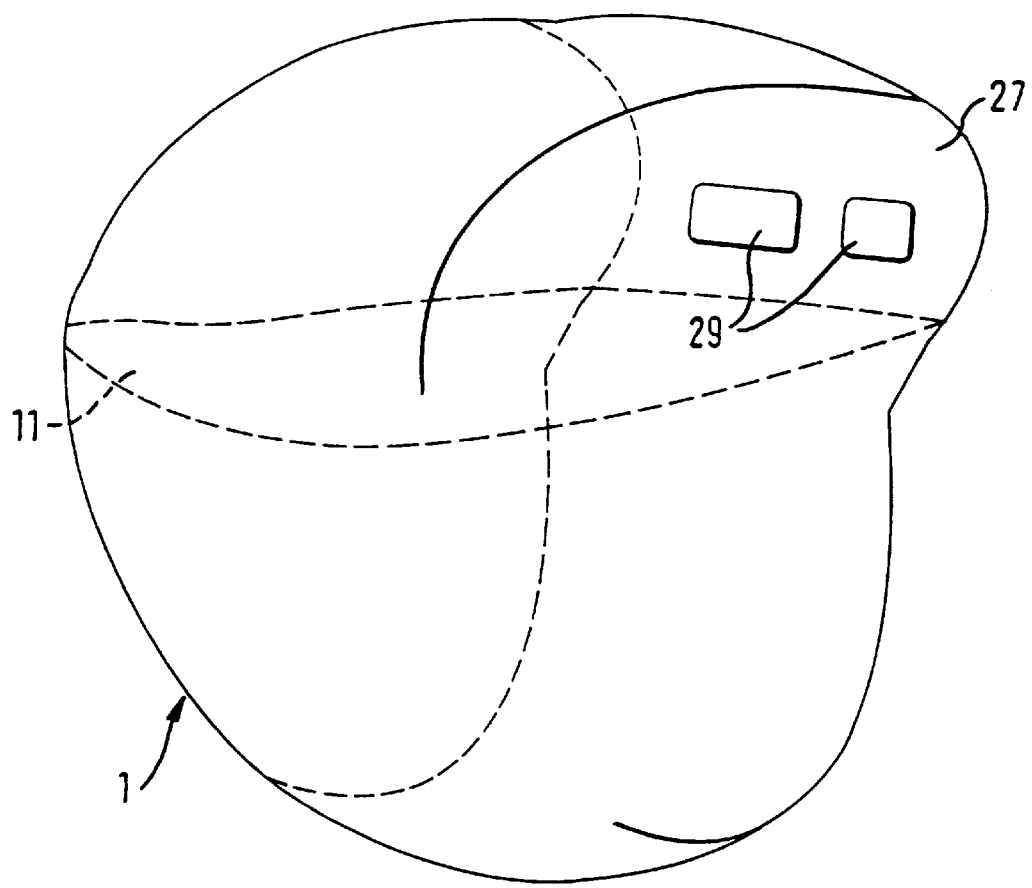
FIG. 6 shows a perspective view of the gas bag shown in FIG. 1 with two fully inflated chambers.
Figure 8:
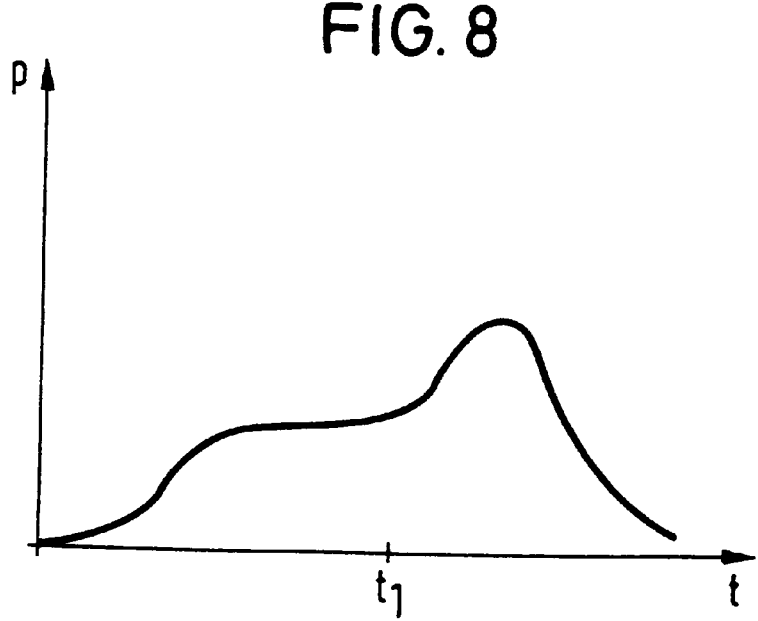
FIG. 8 shows a diagram which shows the evolution of the internal pressure of the gas bag on unfolding of both chambers.

In the case of restraint, as a function of the data determined by means of the sensors 7, one or two stages of the multiple-stage gas generator 3 are activated. If only one stage is activated, the gas bag 1 is inflated into the shape illustrated in FIG. 1, with the internal pressure of the gas bag not being sufficient to destroy the tear seams 21, although a small quantity of gas can flow into the second chamber 15. If, on the other hand, it is advantageous to inflate both chambers 13, 15, the second stage is ignited staggered in time with respect to the first stage, and such a high pressure builds up in the first chamber 13 that the destruction of the tear seams 21 is brought about. In this case, the shape of the gas bag 1 illustrated in FIG. 6 is produced, which also in the fully inflated state has two chambers 13, 15 separated from each other. So that the internal pressure on inflating of both chambers 13, 15 does not rise too abruptly, the two stages of the gas generator 3 are ignited staggered in time with respect to each other. The stepped evolution of pressure in the interior of the gas bag, illustrated in FIG. 8, results, in which t1 represents the moment of activation of the second stage. It has been found that the gentlest restraining for the vehicle occupant by the gas bag can take place when both stages of the gas generator 3 have the same output. With the gas bag restraint system according to the invention, the vehicle occupant does not strike onto a hard gas bag 1, but rather onto a gas bag 1 which initially is harder and then becomes softer again. Due to the evolution of pressure, extreme deceleration values for the occupant are avoided.

The gas bag which is illustrated is very simple to manufacture, because its entire outer wall 9 consists of one part which has a butterfly-shaped blank. The dividing wall 11, which is sewn to the outer wall 9, has a section 27 which (FIG. 6) serves as reinforcement for the rims of two inlet openings 29 and is sewn to the outer wall 9.

Instead of one through-flow opening 16, of course several through-flow openings can be provided in the dividing wall 11. Moreover, the dividing wall 11 can be made of a gas-permeable fabric material.

Figure 9:
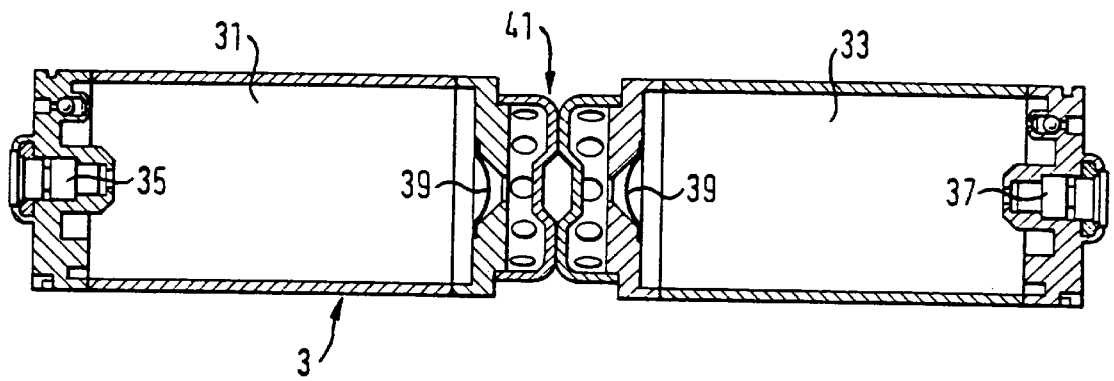
FIGS. 9 and 10 show two different embodiments of gas generators preferably used in the gas bag restraint system according to the invention.
Figure 10:
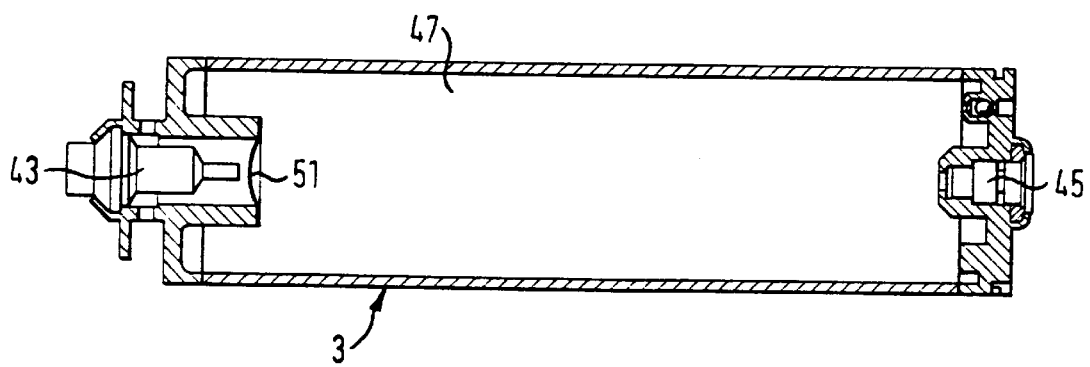

The multiple-stage gas generators 3 illustrated in FIGS. 9 and 10 are able to be employed in the gas bag restraint system which is shown. The multiple-stage gas generator 3 illustrated in FIG. 9 consists of two chambers 31, 33 lying opposite each other, filled with combustible gas, and each having associated a pyrotechnic ignition unit 35, 37. A bursting membrane 39 in each chamber 31, 33 prevents an outflow of the gas into an intermediate section 41 which is provided with outflow openings. When the gas in the chamber 31 is ignited, it bursts the bursting membrane 39 and flows into the gas bag. Staggered in time with respect to this, the gas in the chamber 33 can be ignited, so that a further pressure rise is produced inside the gas bag.

With the multiple-stage gas generator shown in FIG. 10, different internal pressures of the gas bag can be achieved, depending on the time interval between the ignition of two opposing charges 43, 45. Hence, evolutions of pressure can be produced according to a set of curves illustrated in FIG. 11. Inside the chamber 47 of the gas generator 3, an air/hydrogen mixture is stored, which flows into the gas bag after opening a dividing wall 51. The opening of the dividing wall 51 is caused by igniting the charge 43. Then the charge 45 is ignited, which then ignites the still unignited air/hydrogen mixture which is still situated in the chamber 47. The later the charge 45 is ignited, the less air/hydrogen mixture is still present in the chamber 47 and the smaller the pressure rise is which is able to be achieved by igniting the mixture.

Figure 11:
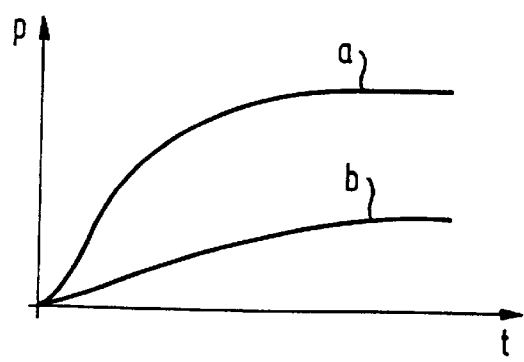
FIG. 11 shows the different evolutions of gas pressure which are able to be achieved by the gas generator according to FIG. 10.

In FIG. 11, the evolutions of pressure are illustrated diagrammatically with ignitions which are staggered in time by 5 ms and by 50 ms. By use of the gas generator 3 shown in FIG. 10, not only two different gas bag internal pressures can be achieved, but the most varied of gas bag internal pressures, so that the gas bag 1 can be adapted precisely to the position or to the physical constitution of the vehicle occupant.

What is claimed is:

1. A gas bag restraint system for vehicle occupants, comprising:
    a gas bag with an interior having a first and a second chamber,
    said gas bag having an outer wall delimiting said interior of said gas bag and at least one dividing wall in said interior for permanently separating said first and said second chambers,
    said dividing wall being gas-permeable at least while said gas bag is inflating to reach a fully inflated state of said gas bag,
    a multiple-stage gas generator which is permanently communicated with said first chamber and which is able to produce different internal pressures of said gas bag, and
    holding means which prevent unfolding of a part of said outer wall delimiting said second chamber before reaching a predetermined internal pressure of said gas bag, and which permit full inflation of said second chamber after said predetermined internal pressure of said gas bag has been reached.

2. The gas bag restraint system according to claim 1, wherein said dividing wall has at least one through-flow opening.

3. The gas bag restraint system according to claim 1, wherein said dividing wall is of a gas-permeable material.

4. The gas bag restraint system according to claim 1, wherein said part of said outer wall delimiting said second chamber, is taut when only said first chamber is inflated.

5. The gas bag restraint system according to claim 1, wherein said part of said outer wall delimiting said second chamber have folded and superimposed sections, and wherein said holding means comprise at least one tear seam, which connects to each other said folded and superimposed sections.

6. The gas bag restraint system according to claim 5, wherein said tear seam connects said outer wall with said dividing wall.

7. The gas bag restraint system according to claim 6, wherein said dividing wall has at least one through-flow opening and wherein said tear seam extends in a U- or n-shape and close to said through-flow opening.

8. The gas bag restraint system according to claim 6, wherein said dividing wall has at least one through-flow opening and wherein at least two substantially parallel tear seams are provided.

9. The gas bag restraint system according to claims 6, wherein said dividing wall has at least one through-flow opening and wherein a tear seam is provided, surrounding said through-flow opening.

10. The gas bag restraint system according to claim 1, wherein, in a state in which only said first chamber is inflated, said part of said outer wall delimiting said second chamber has an unfolded and a folded region, said holding means connecting at least said folded region of said outer wall with said dividing wall.

11. The gas bag restraint system according to claim 1, wherein said multiple-stage gas generator produces gas in at least two stages which are identical in terms of output and are able to be activated separately from each other.

12. The gas bag restraint system according to claim 1, wherein several ignition units are provided and wherein said multiple-stage gas generator can produce different internal pressures in said gas bag as a function of a chronological staggering in time between activation of said several ignition units.

13. The gas bag restraint system according to claim 12, wherein a control unit and also sensors connected therewith are provided, said control unit being coupled with said multiple-stage gas generator and being able to activate one or several ignition units as a function of the data determined by said sensors.

14. The gas bag restraint system according to claim 12, wherein said system is arranged in a vehicle having a longitudinal direction and comprising a seat belt and wherein said sensors can determine at least one of the following data:
    state of belt application;
    impact intensity of the vehicle in the case of a collision;
    weight of a vehicle occupant who is to be restrained;
    position of a vehicle occupant who is to be restrained, in said longitudinal direction of said vehicle; and
    position of a vehicle occupant who is to be restrained, transversely to said longitudinal direction of said vehicle.

15. The gas bag restraint system according to claim 14, wherein said sensors are several ultrasonic sensors arranged in said vehicle, which determine the position of said vehicle occupant.

16. The gas bag restraint system according to claim 15, wherein said sensors scan at least the position of one of the following body parts of the occupant:

head and upper body;

chest and pelvis; and thigh region.

17. The gas bag restraint system according to claim 1, wherein said outer wall of said gas bag is a blank cut in one piece.

18. The gas bag restraint system according to claim 1, wherein said gas bag has an inflation orifice delimited by a rim of said gas bag, and wherein said dividing wall has a section reinforcing said rim.

19. The gas bag restraint system according to claim 1, wherein said dividing wall is permanently gas-permeable.

20. The gas bag restraint system according to claim 1, wherein several dividing walls separating more than two chambers are provided.

* * * * *

UNITED STATES PATENT AND TRADEMARK OFFICE
CERTIFICATE OF CORRECTION

PATENT NO. : 6,196,575 B1
DATED : March 6, 2001
INVENTOR(S) : Norbert Ellerbrok et al.

It is certified that error appears in the above-identified patent and that said Letters Patent is hereby corrected as shown below:

Column 6,
Line 46, change "12" to -- 13 --.

Signed and Sealed this

Twenty-eighth Day of May, 2002

Attest:

Attesting Officer

JAMES E. ROGAN
Director of the United States Patent and Trademark Office